(12) United States Patent
Schöttler et al.

(10) Patent No.: US 10,209,010 B2
(45) Date of Patent: Feb. 19, 2019

(54) PRESSURELESS HEAT STORAGE DEVICE FOR WATER TEMPERATURES OVER 100° C

(71) Applicant: Siemens Aktiengesellschaft, Munich (DE)

(72) Inventors: Michael Schöttler, Erlangen (DE); Andre Grobstich, Steinberg (DE)

(73) Assignee: Siemens Aktiengesellschaft, Munich (DE)

( * ) Notice: Subject to any disclaimer, the term of this patent is extended or adjusted under 35 U.S.C. 154(b) by 411 days.

(21) Appl. No.: 14/911,799

(22) PCT Filed: Aug. 4, 2014

(86) PCT No.: PCT/EP2014/066728
§ 371 (c)(1),
(2) Date: Feb. 12, 2016

(87) PCT Pub. No.: WO2015/024765
PCT Pub. Date: Feb. 26, 2015

(65) Prior Publication Data
US 2016/0187071 A1 Jun. 30, 2016

(30) Foreign Application Priority Data
Aug. 19, 2013 (EP) ..................... 13180872

(51) Int. Cl.
*F28D 20/02* (2006.01)
*F28D 20/00* (2006.01)

(52) U.S. Cl.
CPC .. *F28D 20/0039* (2013.01); *F28D 2020/0082* (2013.01); *F28D 2020/0086* (2013.01); *Y02E 60/142* (2013.01)

(58) Field of Classification Search
CPC ........... F28D 20/0039; F28D 2020/082; F28D 2020/0086; Y02E 60/142
USPC ........................................... 165/10
See application file for complete search history.

(56) References Cited

U.S. PATENT DOCUMENTS 4,299,275 A * 11/1981 Robinson, Jr. ...... F28D 20/0034
126/636
4,508,102 A * 4/1985 Hager ................. F28D 20/0039
126/592

FOREIGN PATENT DOCUMENTS

| DE | 19548816 A1 | 7/1997 |
| DE | 10040892 C1 | 10/2001 |
| DE | 2020006002535 U1 | 6/2006 |
| DE | 102012024073 A1 | 8/2013 |
| EP | 1411312 A1 | 4/2004 |
| EP | 2354474 A1 | 8/2011 |

(Continued)

*Primary Examiner* — Leonard R Leo
(74) *Attorney, Agent, or Firm* — Beusse Wolter Sanks & Maire

(57) ABSTRACT

A heat storage device for storing and providing heat energy accruing with the power generation by means of a fluid, includes at least a first and a second chamber. The first chamber is disposed above the second chamber and a conduit disposed substantially in the chambers connects an upper region of the first chamber to a lower region of the second chamber, such that in operation there are no temperature differences and thus also no buoyancy forces between end points of the conduit. An installation is for combined heat and power, and a method is for storing and providing heat energy accruing with the power generation.

12 Claims, 6 Drawing Sheets

(56) References Cited

FOREIGN PATENT DOCUMENTS

| EP | 2455696 A2 | 5/2012 |
|----|------------|--------|
| EP | 2698584 A1 | 2/2014 |
| FR | 2405443 A1 | 5/1979 |
| NL | 1033139 C2 | 6/2008 |
| WO | 2009049612 A2 | 4/2009 |

\* cited by examiner

PRESSURELESS HEAT STORAGE DEVICE FOR WATER TEMPERATURES OVER 100° C

CROSS REFERENCE TO RELATED APPLICATIONS

This application is the U.S. National Stage of International Application No. PCT/EP2014/066728 filed Aug 4, 2014, and claims the benefit thereof. The International Application claims the benefit of Eurpean Application No. EP13180872 filed Aug 19, 2013. All of the applications are incorporated by reference herein in their entirety.

FIELD OF INVENTION

The invention relates to a heat storage device, in particular a heat storage device for storing and providing by means of a fluid thermal energy arising during power generation, and relates to pressureless storage for temperatures over 100° C. The invention further relates to a plant for combined heat and power generation and to a method for storing and providing by means of a fluid thermal energy arising during power generation.

BACKGROUND OF INVENTION

As a result of the highly fluctuating infeed of renewable energy (sun/wind) into power grids, the dilemma arises with regard to CHP plants (CHP=combined heat and power) that they are supposed on the one hand to supply thermal energy in accordance with district heating requirements and on the other hand to supply electricity in accordance with grid requirements, wherein it may become uneconomic for example at night or at weekends to burn fossil fuels to generate district heating because the price of electricity is then often very low (in future possibly even ever more frequently negative). To decouple the production of thermal and electrical energy, district heat storage devices are therefore increasingly being used, preferably in the form of pressureless stratified hot water storage devices. Since pressureless stratified storage devices can only be charged at water temperatures <100° C. (in practice this is mostly limited to <95° C.) and since heat exchangers with additional temperature differences are often interposed between storage device and district heating network (since the district heating network often has a significantly higher operating pressure than the buffer tank), the actual useful temperature in discharge mode sometimes falls below 85° C. In transitional periods (spring/fall) and above all in winter, however, the conventional district heating networks are operated at flow temperatures markedly above 95° C. (up to around 135/140° C.): apart from in the summer when district heating flow temperatures are lower than 85-95° C., it is therefore not possible with the concept that is currently conventional to operate the district heating network solely from the heat storage device alone and to completely shut down the CHP plant or the fired or electrical auxiliary boiler.

To be able to charge stratified hot water storage devices at higher district heat flow temperatures over 95° C., sometimes pressure vessels are used which can be charged and discharged at correspondingly higher flow temperatures due to the pressure-dependent saturation temperatures. The major disadvantage of pressure vessels is however significantly higher testing overheads during production, and recurrent testing (for example pressure testing with cold water after 10 years, recurrent visual inspection of all weld seams, for which purpose all insulation would have to be removed from the tanks). In addition, insurance premiums rise steeply for pressure vessels depending on the pressure and volume (since the risk has been assessed as very high by the insurers) and thus pressure vessels are at present very seldom used for large storage volumes for cost reasons.

SUMMARY OF INVENTION

It is an object of the invention to provide a heat storage device of the initially stated type which allows simple and inexpensive storage of water over 100° C. A further object of the invention is to provide a corresponding plant for combined heat and power generation. It is moreover an object of the invention to provide a method for storing and providing by means of a fluid thermal energy arising during power generation.

The object directed to a heat storage device is achieved by the invention in that said invention provides such a heat storage device for storing and providing by means of a fluid thermal energy arising during power generation with at least one first and one second chamber, wherein the first chamber is arranged above the second chamber and a line arranged substantially in the chambers connects an upper region of the first chamber with a lower region of the second chamber, such that there are no temperature differences between end points of the line during operation and thus also no buoyancy forces.

The invention exploits the fact that tanks (of whatever height) open to the atmosphere are not classed as pressure vessels but rather as buildings or operational equipment, irrespective of the static pressure and operating temperature, since pressure is defined as overpressure relative to atmospheric pressure. Embodying the heat storage device as an open component means no additional overpressure can form.

The invention therefore provides the arrangement of a plurality of stratified storage devices one above the other in "chambers", so preventing hot water at above 100° C. from reaching the upper regions of the tank. Furthermore, so that the tank is classed as a pressureless tank open to the atmosphere, all the chambers must be connected by internal connection lines (in the case of external connection lines, the chambers would be regarded as individual pressure vessels which can be pressurized via pipes). To prevent these connection lines from causing thermal equalizing flows (since hot water is less dense than cold water), the upper region of each chamber is always connected with the lower region of the chamber therebelow: in operation there are no temperature differences between the end points of the connection lines and thus also no buoyancy forces (and thus also no thermal circulation which might destroy the stratification).

The height of the heat storage device may also determine the pressure in the lower part of the heat storage device. The number and height of the individual chambers is advantageously selected such that, on the one hand, charging is possible at the maximum flow temperature (for example, should the installation height of the lowest intermediate bottom, i.e. the bottom between the bottom chamber and the chamber thereabove, be selected such that in the upper part of the bottom chamber "static pressure">"saturation pressure of the maximum flow temperature" always applies) and, on the other hand, maximum charging is achieved at minimum cost (i.e. a relatively large number of intermediate bottoms above the bottom "large" chamber, so that the maximum charging temperature in the upper part of each further chamber is as high as possible due to the relatively high static pressure).

In the case of tall heat storage devices, the static pressure in the lower part of the heat storage device may reach very elevated values, which allow "pressureless" storage of district heating hot water up to over 135° C.

The height of the heat storage device or of the chambers determines the operating pressure in the hot part (which is generally connected with the hot district heating flow). This operating pressure in the hot part of the heat storage device is selected such that it comes to lie above the saturation pressure corresponding to the maximum possible district heating flow temperature (for example in winter).

In one advantageous embodiment, a lower region of the first chamber is connected via a line, which may be shut off and in which a pump is arranged, with a lower region of at least one chamber therebelow. This enables charging limitation. If the bottom chamber is completely filled, the hot water, at for example 135° C., would flow on further charging via the equalizing line into the upper part of the second-to-bottom chamber and there as a result of the lower static pressure form steam bubbles, which it is however necessary to prevent. Therefore, when the maximum allowable temperature is reached in the lower part of each chamber, relatively cold return water from the lowest part of the top chamber is pumped/added, and in this way the respective maximum allowable chamber temperature (corresponding to static chamber pressure) is regulated. Once the top chamber has also reached the maximum allowable temperature (in the lower region, where the return is connected), further charging is no longer possible.

So that heat transfer from the hot to the cold medium is as low as possible, it is advantageous for the line, i.e. the equalizing line between two chambers, to be thermally insulated.

For the same reason, it is advantageous for any two adjacent chambers to be separated from one another by an insulated intermediate bottom.

To prevent damage to the intermediate tank bottoms when filling an empty tank, it is advantageous for at least one pressure equalizing valve, which opens in the event of a corresponding pressure difference, to be arranged between any two adjacent chambers. Thus, when the tank is filled from below via the bottom chamber, the air can escape into the respective next chamber up. When filling the tank from above via the top chamber, the water will flow through these pressure equalizing valves into the respective next chamber down. Slight pressure differences at the intermediate bottoms are inevitable during operation due to the different density of the water in the individual chambers and in the parallel-connected equalizing lines.

A vent valve connected to the top chamber via a line is advantageously provided at the highest point of a chamber arranged below a top chamber. This vent valve may either be an automatic vent valve and may for example operate mechanically (for example as a float valve) or it may for example be a motor-operated valve, which is driven by way of filling level measurements in the corresponding chamber. These vent valves remove any air that may arise (for example also during initial filling) and also steam that arises (for example on charging a chamber at an excessively high temperature).

As is already conventional and common in the hitherto conventional pressureless buffer storage devices, the heat storage device according to the invention may also take the form of a tank closed at the top. It is therefore convenient for the top chamber to take the form of a tank closed at the top and for a steam or inert gas feed to be provided. This chamber may then be supplied with inert gas (for example nitrogen $N_2$) or blanketing steam at an operating pressure <0.5 bar, to prevent undesired enrichment of the water content with atmospheric oxygen ($O_2$) or carbon dioxide ($CO_2$) and further to increase the operating pressure and thus the maximum charging temperature. According to the Pressure Equipment Directive 97/23/EC, closed vessels which can only be operated with an overpressure of up to a maximum of 0.5 bar (i.e. pressure protection for example by safety valve is required) are not classed as pressure vessels and are thus not subject to the Pressure Equipment Directive.

For optimum charging and discharging of the heat storage device and depending on heat distribution in the heat storage device, it is convenient for the first chamber to have a connection to a district heating return arranged in a lower region and for the bottom chamber to have a connection to a district heating flow arranged in an upper region.

It is advantageous for an additional chamber to be arranged above the first chamber, which additional chamber is connected to the bottom chamber via a line, wherein the line leads into a lower region of the bottom chamber. In other words, if the part of the storage device connected to the district heating return is provided with a cover and a small supply of cold water is held above this cover, a further chamber arises which is connected to the lowest part of the bottom chamber via a cold water column. In this way, using the different specific weights of the cold water column and of the hot water in the individual chambers, the pressure in the chamber connected to the district heating return may be raised slightly above ambient pressure (a variable overpressure results relative to ambient depending on the temperature difference) and this chamber may be charged with district heating water over 100° C., which further increases the total charging capacity of the heat storage device.

It is moreover advantageous for the fluid in the heat storage device to be suitable for use in a district heating network. In this case, it is particularly convenient for the fluid to be conditioned deionized water.

Firstly, no additional heat exchanger is therefore required for transferring the heat between heat storage device and district heating network, so saving on components. Secondly, such a situation avoids the exergy loss due to the temperature difference at the heat exchanger on charging and discharging the heat storage device. Thirdly, the useful heat capacity of the heat storage device increases (the heat storage device may be charged up to a district heating flow temperature) and fourthly, the district heating network may always be supplied from the heat storage device at the previously stored flow temperature, without supplementary heating (with heat exchangers a temperature difference arises both on charging and on discharging and the discharge temperature is thus always lower than the desired flow temperature by twice the temperature difference).

The object of the invention directed to a plant for combined heat and power generation is achieved by a plant for combined heat and power generation comprising a power generator and a heat storage device as described above.

In this respect, it is advantageous for the operating pressure to be maintained by a connection line between heat storage device and district heating network. The height of the heat storage device determines the operating pressure in the district heating network by means of the geodetic water pressure. It is thus possible to dispense with a separate district heating network system replenishing and pressure maintaining system.

In the inventive method for storing and providing by means of a fluid thermal energy arising during power generation, wherein an operating pressure in a hottest part of a storage device comes to lie above a saturation pressure of the fluid in accordance with a maximum possible district heating flow temperature, the fluid is stored in superposed, interconnected chambers, wherein the hottest part is stored in the bottom chamber, wherein the pressure for the hottest part is generated in the bottom chamber by colder fluid lying thereover.

In the heat storage device according to the invention, excess district heat may be stored at the conventional flow temperatures of up to around 135° C. (or higher, depending on the heat storage device height and embodiment) and drawn again when required and fed back into the district heating network without further supplementary heating. In this way, at times of low network prices the combined heat and power plant may be completely shut down and the district heating network operated at the necessary flow temperature from the heat storage device.

The tank of the heat storage device may take the form of a pressureless tank open to the atmosphere and is thus not subject to the Pressure Equipment Directive. No regular pressure testing and visual inspections are required. Insurance premiums are markedly lower than for a pressure vessel.

The necessary storage tank volumes may be reduced dramatically since, instead of the approx. 60° C. return temperature and maximum of 95° C. (i.e. a temperature difference of around 35K) which has hitherto been conventional for pressureless tanks, the heat storage device can be charged and discharged with a temperature difference of up to 75K (e.g. from 60° C. to 135° C.). The heat storage device according to the invention is of course only charged with the maximum district heating temperature in the bottom chamber, since the higher chambers have somewhat lower pressures.

BRIEF DESCRIPTION OF THE DRAWINGS

The invention is explained in greater detail by way of example with reference to the drawings, in which, diagrammatically and not to scale.

DETAILED DESCRIPTION OF INVENTION

Figure 1:
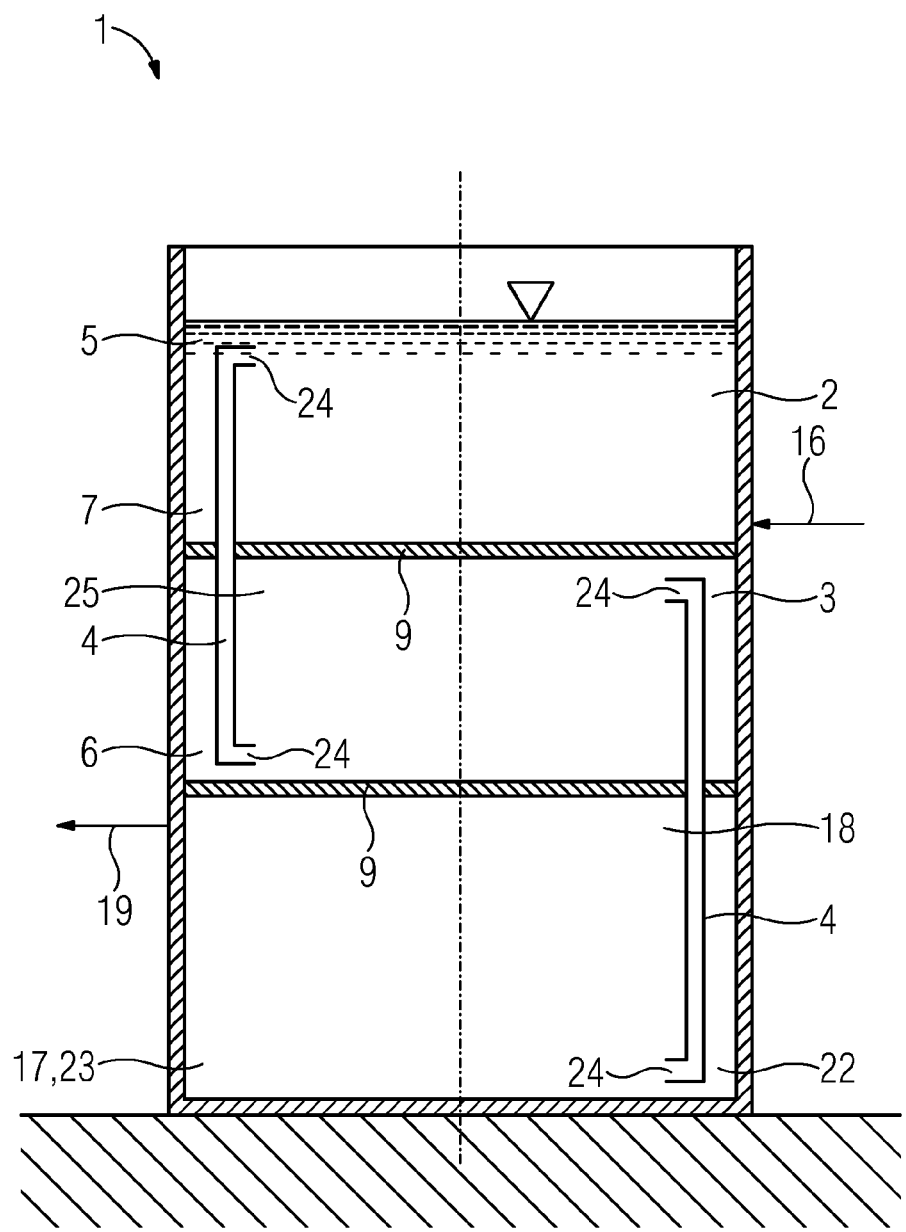
FIG. 1 shows a heat storage device in the form of a pressureless, open vessel according to the invention.

FIG. 1 is a schematic representation, by way of example, of a heat storage device 1 according to the invention. Such a heat storage device 1 comprises at least one first 2 and one second chamber 3, wherein the chambers 2, 3 are generally for the most part closed cavities but may, in the case of a top chamber, also be open at the top, since the heat storage device is a hot water storage device and water may also be readily stored in open-topped vessels. The first chamber 2 is arranged above the second chamber 3 and a line 4 arranged substantially in the chambers 2, 3 connects an upper region 5 of the first chamber 2 with a lower region 6 of the second chamber 3. A heat storage device 1 according to the invention typically comprises more than just two chambers 2, 3. The exemplary embodiment of FIG. 1 for example also comprises a third 23, bottom chamber 17. The height of such a heat storage device 1 is of the order of several tens of meters, for example 40 m.

The lines 4 are arranged substantially vertically in the heat storage device 1 and, for uniform flow of the fluid, typically conditioned deionized water, comprise horizontal ends 24 in the heat storage device 1. Other line terminations are however also feasible. FIG. 1 shows just one line 4 between chamber pairs 2, 3 and 3, 23 but this is not intended to be limiting. It is likewise possible to provide more than just one line 4 for connecting pairs of chambers 2, 3 and 3, 23.

The temperature distribution in the heat storage device 1 of FIG. 1 could be as follows in the charged state: The third 23 and at the same time bottom chamber 17 displays a temperature of for instance 120° C. in an upper region 18. The temperature in the lower region 22 of the bottom chamber 17 still amounts to approximately 100° C., as does that of the upper region 25 of the second chamber 3. The temperature of the lower region 6 of the second chamber 3 and of the upper region 5 of the first chamber 2 is approximately 80° C.

To keep heat transfer from the hot to the cold medium as low as possible, the lines 4 are thermally insulated.

For the same reason, any two adjacent chambers 2, 3 and 3, 23 are separated from one another by an insulated intermediate bottom 9.

In the exemplary embodiment, the first chamber 2 comprises a connection 16 arranged in the lower region 7 to the district heating return and the third 23, bottom chamber 17 comprises a connection 19 arranged in the upper region 18 to the district heating flow. The heat storage device 1 may also be charged and discharged via these connections.

Figure 2:
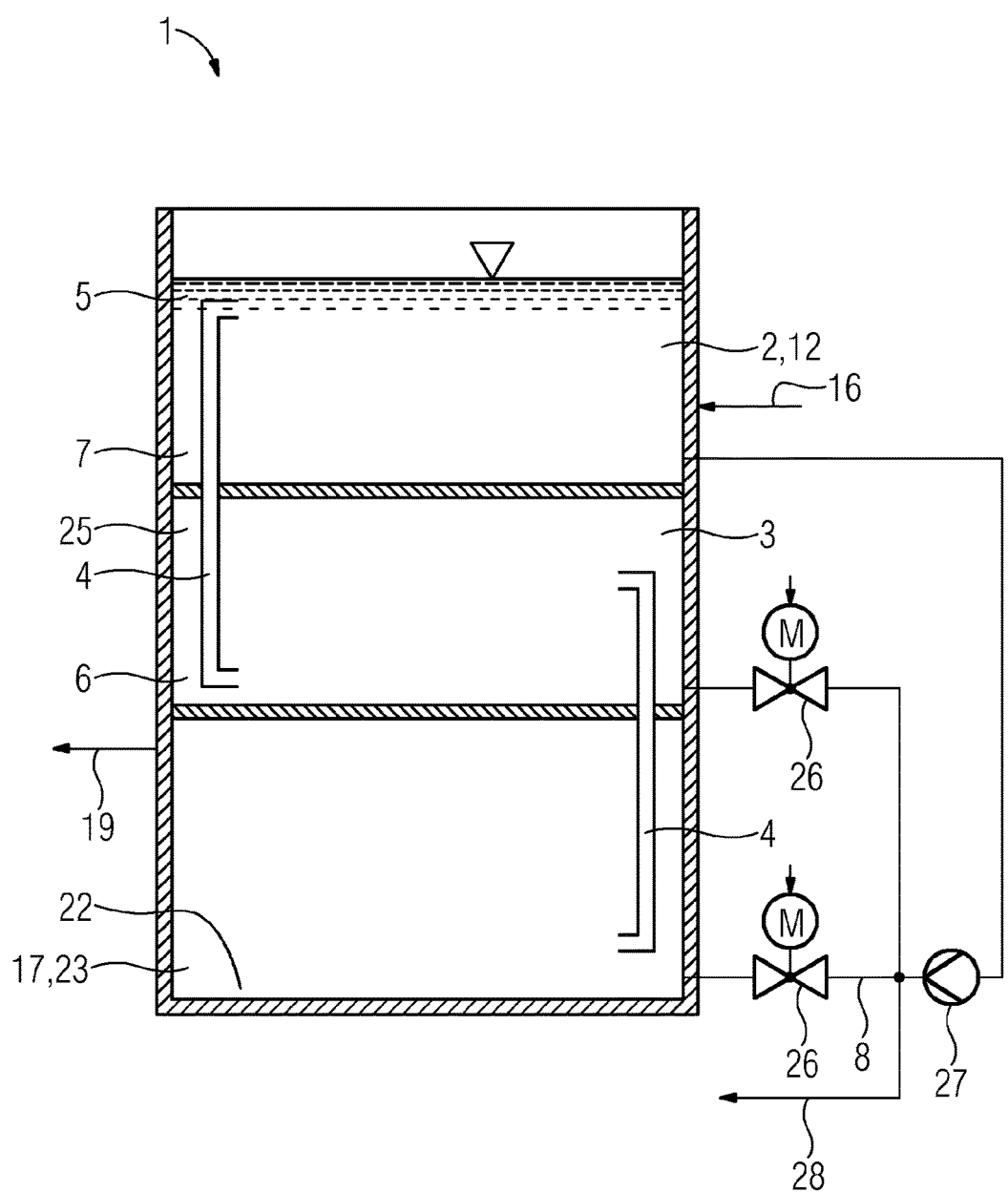
FIG. 2 shows a heat storage device according to the invention with overcharging protection.

FIG. 2 shows a heat storage device 1 according to the invention with overcharging protection. In this case, a lower region 7 of the top 12, first chamber 2 is connected via a line 8, which may be shut off with valves 26 and into which a pump 27 is connected, with the lower regions 6, 22 of the second and third chambers 3, 23 therebelow. If the third 23, i.e. bottom chamber 17 is completely filled, the hot water, at for example 135° C., would flow on further charging via the equalizing line 4 into the upper region 25 of the second chamber 3 and there as a result of the lower static pressure form steam bubbles, which it is however necessary to prevent. Therefore, when the maximum allowable temperature is reached in the lower region 6, 22 of the second 3 and third chambers 23, relatively cold return water is pumped and added from the lower region 7 of the top 12, first chamber 2, and in this way the respective maximum allowable chamber temperature is regulated. Once the top chamber 12 has also reached the maximum allowable temperature (in the lower region 7, where the return is connected), further charging is no longer possible. In addition to the overcharging protection, the pump 27 may also be used to maintain the district heating pressure 28.

Figure 3:
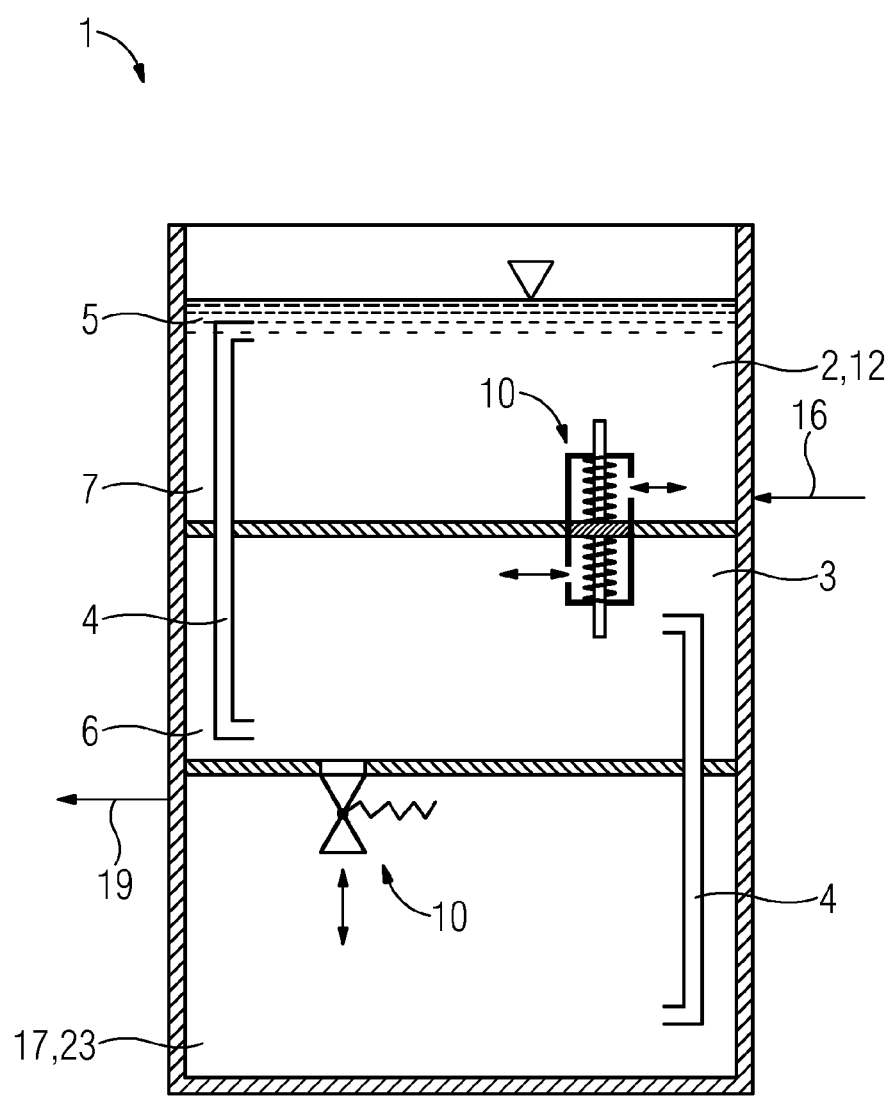
FIG. 3 shows a heat storage device according to the invention with overpressure protection.

FIG. 3 shows a heat storage device 1 according to the invention with overpressure protection, wherein at least one pressure equalizing valve 10 is arranged between any two adjacent chambers 2, 3 and 3, 23, which valve opens in the case of a corresponding pressure difference. Thus, when the heat storage device 1 is filled from below via the bottom chamber 17, the air can escape into the respective next chamber 3 or 2 up. When filling the heat storage device 1 from above via the top chamber 12, the water will flow through these pressure equalizing valves 10 into the respective next chamber 3, 23 down.

Figure 4:
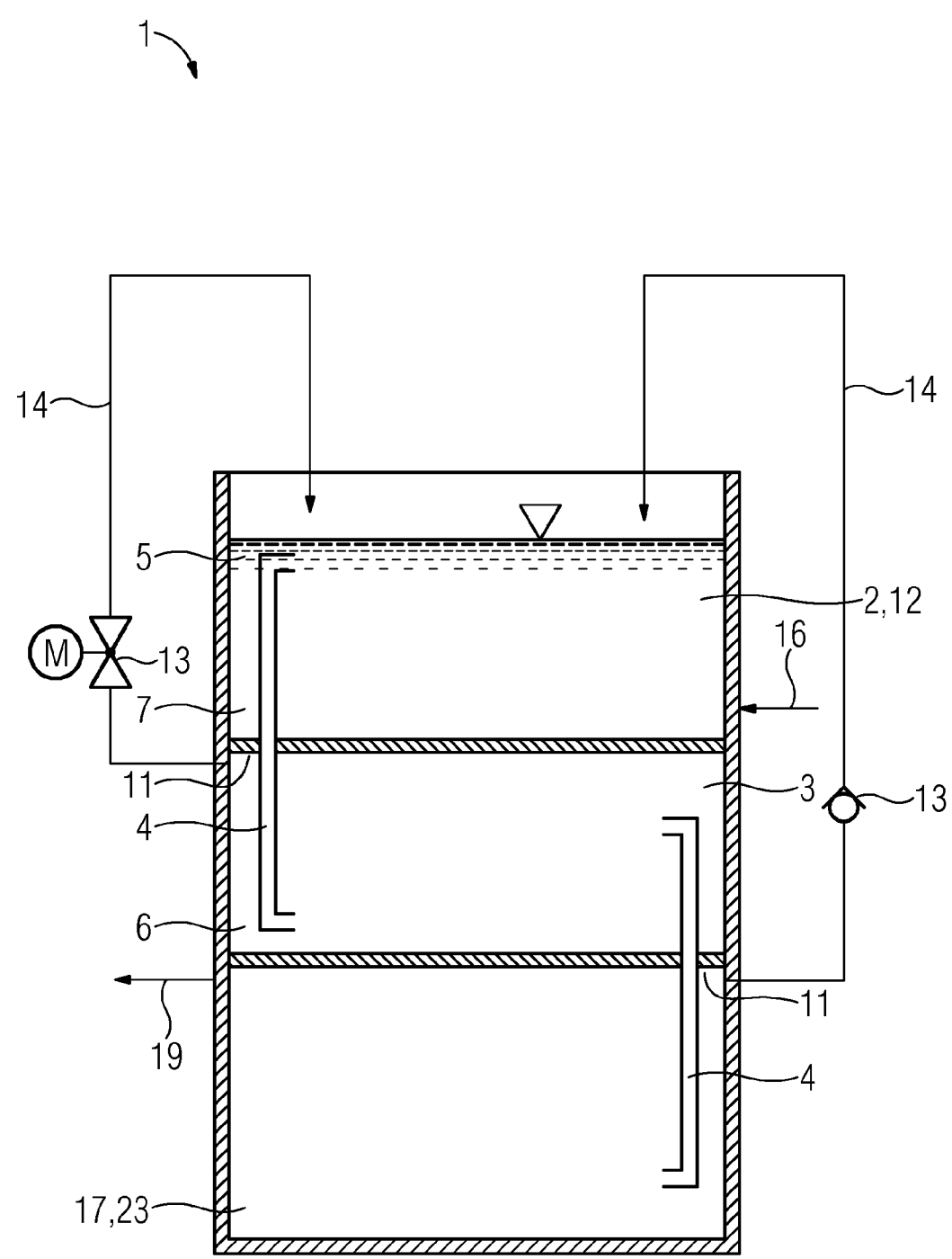
FIG. 4 shows a heat storage device according to the invention with chamber venting.

FIG. 4 shows a heat storage device 1 according to the invention with chamber venting. At the highest points 11 of the second 3 and third chambers 23, vent valves 13 are provided, which are connected with the top 12, first chamber 2 via lines 14. These vent valves 13 may for example operate as float valves. Other valves, for example motor-operated valves are also possible, these being driven by way of filling level measurements in the corresponding chambers. These vent valves 13 remove any air that may arise (for example also during initial filling) and also steam that arises (for example on charging a chamber at an excessively high temperature).

Figure 5:
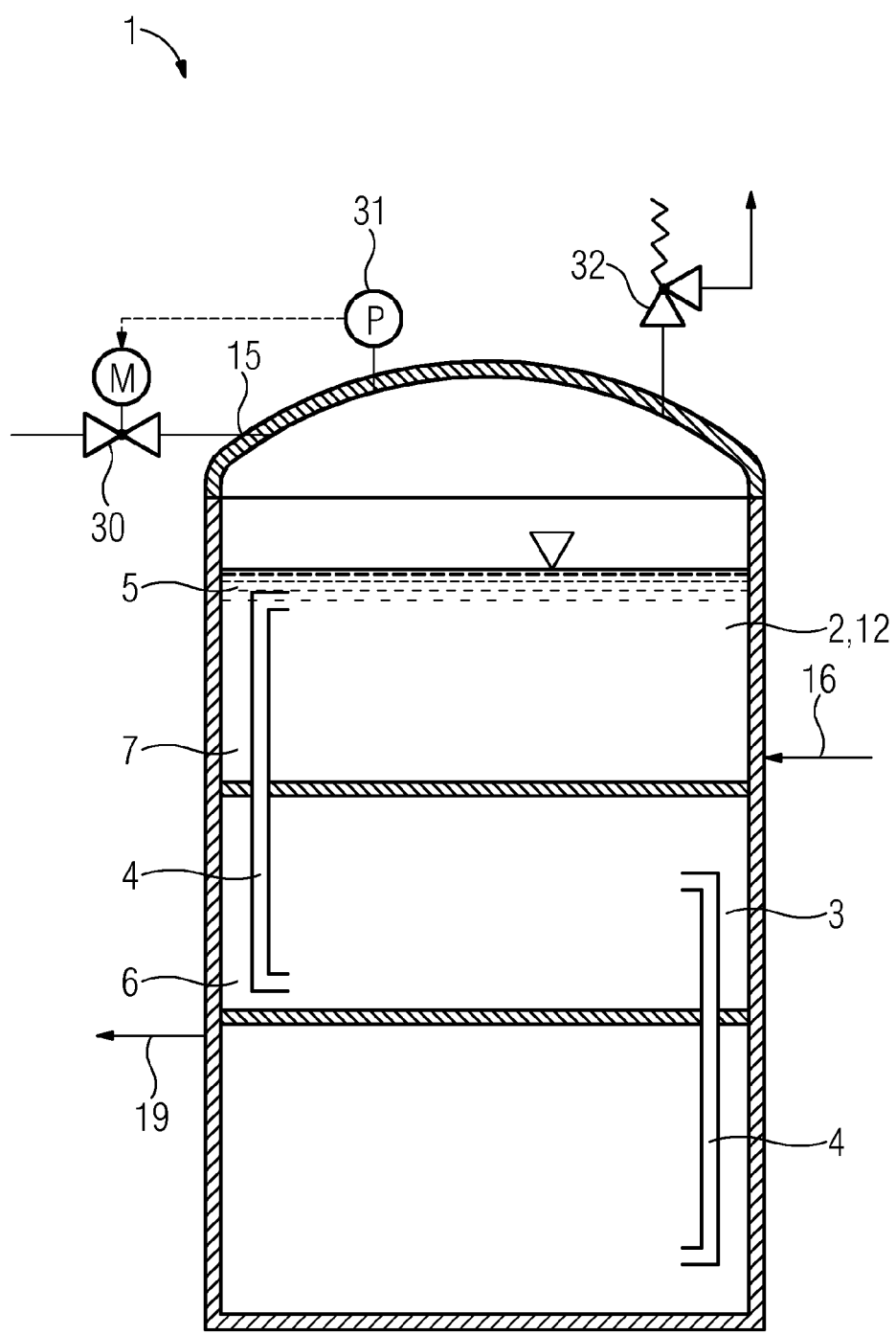
FIG. 5 shows a heat storage device according to the invention with steam blanketing and FIG. 6 shows a heat storage device according to the invention with additional chamber and cold water circulation to increase the static pressure in the chambers therebelow.

FIG. 5 shows a heat storage device 1 according to the invention, wherein the top chamber 12 takes the form of a tank closed at the top and a steam or inert gas feed 15 is provided, such that this chamber 12 may be supplied with inert gas (for example nitrogen $N_2$) or blanketing steam at an operating pressure <0.5 bar, to prevent undesired enrichment of the water content with atmospheric oxygen ($O_2$) or carbon dioxide ($CO_2$). Feed of inert gas or steam is regulated in the example of FIG. 5 by a motor-controlled valve 30, which is coupled to a pressure gauge 31. Furthermore, a pressure relief valve 32 may be provided, to limit the maximum operating pressure to below 0.5 barg.

Figure 6:
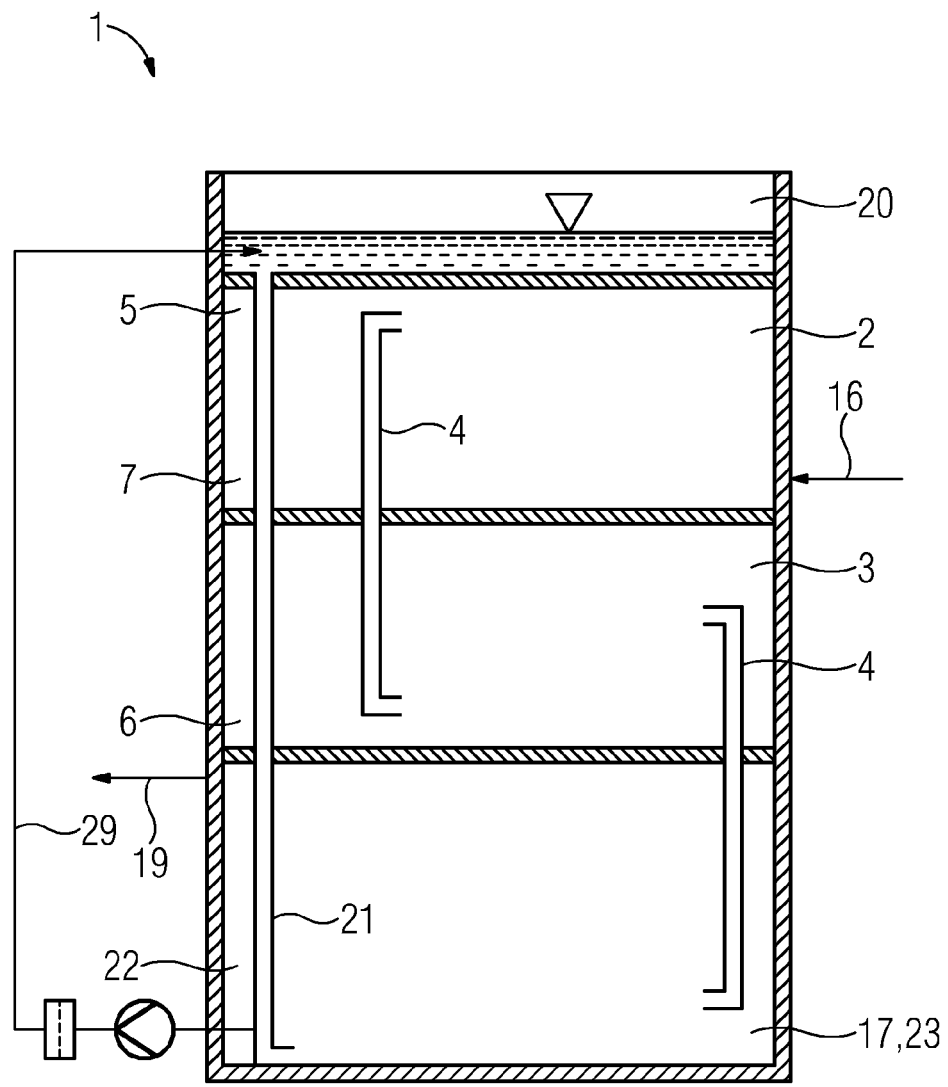

Finally, FIG. 6 shows a heat storage device 1 according to the invention with additional chamber 20 and cold water circulation 29 for increasing the static pressure in the chambers 2, 3, 23 therebelow. In the example of FIG. 6, an additional chamber 20 is arranged above the first chamber 2 with the connection 16 to the district heating return, in which additional chamber a comparatively small supply of cold water is held. The additional chamber 20 is connected with the bottom chamber 17 via a line 21 which is arranged in the chambers 2, 3, 23 and in which a cold water column forms. The line 21 leads into a lower region 22 of the bottom chamber 17.

To ensure that a cold water column forms lastingly in the line 21, cold water circulation 29 is provided.

In this way, the pressure in the first chamber 2 with the connection 16 to the district heating return may be raised further by making use of the different specific weights of the cold water column in the line 21 and of the hot water in the individual chambers 2, 3, 23. The first chamber 2 may then be charged with district heating water over 100° C., which further increases the total charging capacity of the heat storage device 1.

The invention claimed is:

1. A heat storage device open to the atmosphere for storing and providing, by means of a fluid, thermal energy arising during power generation, comprising:
    at least one first and one second chamber, wherein the first chamber is arranged above the second chamber, wherein a line is arranged substantially in the chambers connecting an upper region of the first chamber with a lower region of the second chamber, such that temperature differences are minimized between end points of the line during operation;
    a third, bottom chamber, wherein a line is arranged between the second chamber and the bottom chamber, which line connects an upper region of the second chamber with a lower region of the bottom chamber, wherein the lines are thermally insulated, and
    wherein any two adjacent chambers are separated from one another by an insulated intermediate bottom;
    a district heat return connection arranged in a lower region of the first chamber; and
    a district heating flow connection arranged in an upper region of the third chamber to provide fluid flow in the heat storage device during operation.

2. The heat storage device as claimed in claim 1, wherein a lower region of the first chamber is connected via a line, which may be shut off and in which a pump is arranged, with a lower region of at least one chamber therebelow.

3. The heat storage device as claimed in claim 1, further comprising:
    at least one pressure equalizing valve between any two adjacent chambers.

4. The heat storage device as claimed in claim 1, further comprising:
    a vent valve connected to the first chamber via a line at the highest point of a chamber arranged below the first chamber.

5. The heat storage device as claimed in claim 1, wherein the first chamber takes the form of a tank closed at the top and a steam or inert gas feed is provided.

6. The heat storage device as claimed in claim 1, wherein the first chamber has a connection arranged in a lower region to a district heating return and a bottom chamber has a connection arranged in an upper region to a district heating flow.

7. The heat storage device as claimed in claim 1, further comprising:
    an additional chamber arranged above the first chamber, which additional chamber is connected to the bottom chamber via a line, wherein the line leads into a lower region of the bottom chamber.

8. The heat storage device as claimed in claim 1, wherein the fluid is suitable for use in a district heating network.

9. The heat storage device as claimed in claim 8, wherein the fluid is conditioned deionized water.

10. A plant for combined heat and power generation, comprising
    a power generator; and
    a heat storage device open to the atmosphere for storing and providing, by means of a fluid, thermal energy arising during power generation, the heat storage device comprising:
    at least one first and one second chamber, wherein the first chamber is arranged above the second chamber, wherein a line is arranged substantially in the chambers connecting an upper region of the first chamber with a lower region of the second chamber, such that temperature differences are minimized between end points of the line during operation;
    a third, bottom chamber, wherein a line is arranged between the second chamber and the bottom chamber, which line connects an upper region of the second chamber with a lower region of the bottom chamber,
    wherein the lines are thermally insulated, and
    wherein any two adjacent chambers are separated from one another by an insulated intermediate bottom;
    a district heat return connection arranged in a lower region of the first chamber; and
    a district heating flow connection arranged in an upper region of the third chamber to provide fluid flow in the heat storage device during operation.

11. The plant as claimed in claim 10, further comprising:
a connection line between the heat storage device and a district heating network.

12. A method for storing and providing, by means of a fluid, thermal energy arising during power generation, with an operating pressure in a hottest part of a heat storage device open to the atmosphere coming to lie above a saturation pressure of the fluid in accordance with a maximum possible district heating flow temperature, wherein the heat storage device comprises: at least one first and one second chamber, wherein the first chamber is arranged above the second chamber, wherein a line is arranged substantially in the chambers connecting an upper region of the first chamber with a lower region of the second chamber, such that temperature differences are minimized between end points of the line during operation, and a third, bottom chamber, wherein a line is arranged between the second chamber and the bottom chamber, which line connects an upper region of the second chamber with a lower region of the bottom chamber, wherein the lines are thermally insulated, and wherein any two adjacent chambers are separated from one another by an insulated intermediate bottom, a district heat return connection arranged in a lower region of the first chamber, a district heating flow connection arranged in an upper region of the third chamber to provide fluid flow in the heat storage device during operation, the method comprising:

storing the fluid in superposed, interconnected chambers, and storing the hottest part in the bottom chamber, wherein the pressure for the hottest part is generated in the bottom chamber by colder fluid lying thereover.

* * * * *